(12) United States Patent
Willis et al.

(10) Patent No.: US 8,982,671 B2
(45) Date of Patent: Mar. 17, 2015

(54) SEISMIC ENERGY SOURCES AND METHODS OF USE

(75) Inventors: Mark Elliott Willis, Katy, TX (US); Erkan Ay, Katy, TX (US); Norm Warpinski, Cypress, TX (US); Tianrun Chen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 481 days.

(21) Appl. No.: 13/453,776

(22) Filed: Apr. 23, 2012

(65) Prior Publication Data
US 2013/0277139 A1 Oct. 24, 2013

(51) Int. Cl.
| G01V 1/40 | (2006.01) |
| G10K 15/04 | (2006.01) |
| G01V 1/104 | (2006.01) |
| G01V 1/13 | (2006.01) |
| G01V 1/157 | (2006.01) |

(52) U.S. Cl.
CPC ........ *G01V 1/40* (2013.01); *G10K 15/04* (2013.01); *G01V 1/104* (2013.01); *G01V 1/13* (2013.01); *G01V 1/157* (2013.01)
USPC .......................................... 367/145; 181/116

(58) Field of Classification Search
CPC ................................. G01K 15/04; G01V 1/104
USPC .................... 367/145, 75; 181/106, 116, 103; 175/4.55; 102/320
See application file for complete search history.

(56) References Cited

U.S. PATENT DOCUMENTS

| 2,556,299 A | 6/1951 | Scott |
| 2,740,489 A | 4/1956 | White et al. |
| 2,760,591 A | 8/1956 | White et al. |
| 3,064,570 A * | 11/1962 | Smith ........................... 181/116 |
| 3,131,633 A * | 5/1964 | Eisler et al. .................. 181/116 |
| 3,277,977 A | 10/1966 | Silverman |
| 3,365,020 A | 1/1968 | Walker |
| 3,372,770 A | 3/1968 | Clynch |
| 3,835,954 A | 9/1974 | Layotte |
| 4,038,631 A | 7/1977 | Murphy |
| 4,050,540 A | 9/1977 | Cholet et al. |
| 4,059,820 A | 11/1977 | Turpening |
| 4,064,964 A | 12/1977 | Norden |
| 4,284,006 A | 8/1981 | Davis |
| 4,660,674 A | 4/1987 | Airhart |
| 4,712,641 A | 12/1987 | Chelminski |
| 4,793,435 A | 12/1988 | Smith et al. |

(Continued)

OTHER PUBLICATIONS

Martner et al., "Broomstick distributed charge," Geophysics, vol. 27, No. 6, Part II, Dec. 1962, pp. 1007-1015.

(Continued)

*Primary Examiner* — Mark Hellner
(74) *Attorney, Agent, or Firm* — McDermott Will & Emery LLP; John W. Wustenberg

(57) ABSTRACT

The present disclosure provides embodiments seismic energy sources configured to generate enhanced shear wave energy in order to more accurately determine the distribution and orientation of fractures in subterranean formations. At least one seismic energy source includes an elongate rod having a first end and a second end, a detonator coupled to the first end, and a bull plug coupled to the second end. An explosive is helically-wrapped about the elongate rod continuously from the first end to the second end and configured to detonate such that a time-delayed detonation is achieved which induces increased shear wave energy in the surrounding formations.

18 Claims, 4 Drawing Sheets

(56) References Cited

U.S. PATENT DOCUMENTS

| | | | |
|---|---|---|---|
| 4,867,266 A | | 9/1989 | Martin |
| 4,895,218 A | * | 1/1990 | Chen et al. .................... 181/116 |
| 5,483,026 A | | 1/1996 | Hasbrouck et al. |
| 5,907,132 A | * | 5/1999 | Hardage ....................... 181/116 |
| 6,419,044 B1 | | 7/2002 | Tite et al. |
| 6,490,529 B1 | | 12/2002 | Norris et al. |
| 6,648,097 B2 | | 11/2003 | Tite et al. |
| 7,395,897 B2 | | 7/2008 | Gilmer et al. |
| 7,650,962 B2 | | 1/2010 | Quinn et al. |
| 7,916,578 B2 | | 3/2011 | Minto et al. |
| 2004/0100256 A1 | * | 5/2004 | Fickert et al. ................. 324/221 |

OTHER PUBLICATIONS

White et al., "Shear waves from explosive sources," Geophysics, vol. 28, No. 6, Dec. 1963, pp. 1001-1019.

Bois et al., "Well-to-well seismic measurements," Geophysics vol. 37, No. 3, Jun. 1972, pp. 471-480.

Byerelay et al., "4D seismic monitoring applied to SAGD operations at Surmont, Alberta, Canada," SEG abstracts 2009.

Hardee et al., "Downhole seismic source," Geophysics vol. 52, No. 6, Jun. 1987, pp. 729-739.

Kim et al., "Use of an Impulsive Shear Wave Source in a Limestone-Covered Area on the Eastern Shelf in Central Texas," Bolt Technology Corporation, S11.5, not dated.

* cited by examiner

SEISMIC ENERGY SOURCES AND METHODS OF USE

BACKGROUND

The present invention relates to seismic energy sources and, more particularly, to seismic energy sources configured to generate enhanced shear wave energy in order to more accurately determine the distribution and orientation of fractures in subterranean formations.

Seismic geophysical surveys, including microseismic monitoring, are often used in the oil and gas industry in order to map stratigraphy of subterranean formations, lateral continuity of geologic layers, locations of buried paleochannels, positions of faults in sedimentary layers, basement topography, and various other geographic structures. The resulting maps are typically deduced through analysis of the nature of reflections and refractions of generated seismic waves from interfaces between the multiple layers within the particular subterranean formation being mapped.

Microseismic activity generally emits elastic waves in the form of compressional waves ("p-waves") and shear waves ("s-waves"). Microseismic detection can be utilized in conjunction with hydraulic fracturing or water flooding techniques in order to map created fractures. Microseismic detection is also commonly utilized in long term reservoir monitoring applications of either reservoir production or injection. A hydraulic fracture generates microseismic activity that emits p-waves and s-waves. The generated p and s-waves travel through the surrounding earth and are reflected by various subterranean formations to be detected by an adjacent detection system comprising, for example, an array of seismic detection devices. As the p and s-waves reach the detection system, the seismic detection devices transduce the p and s-waves into representative electrical signals. These electrical signals are processed to determine the locations of the microseisms in the reservoir. In order to obtain reliable microseismic data, it is necessary to obtain an accurate formation velocity model using artificial sources in known locations that will generate similar p and s-waves. These p and s-waves are also detected, transduced into electrical signals, and analyzed to determine the seismic nature of the subterranean formations at the given site.

Conventional seismic energy sources often utilize explosives, such as a perforation gun or a simple string shot having explosives wrapped thereabout. Typical perforation guns and string shots, however, provide explosive energy primarily in the radial direction, but fail to produce a substantial amount of seismic energy in the longitudinal direction. As a result, a large amount of p-wave energy is emitted into the surrounding formations, but little s-wave energy is generated. Since microseismic events typically exhibit large s-wave signatures as compared to the corresponding p-wave content, what is needed is a seismic energy source configured to generate substantial amounts of s-wave energy in order to calibrate a more accurate formation velocity model.

SUMMARY OF THE INVENTION

The present invention relates to seismic energy sources and, more particularly, to seismic energy sources configured to generate enhanced shear wave energy in order to more accurately determine the distribution and orientation of fractures in subterranean formations.

In some aspects of the disclosure, a seismic source is disclosed. The seismic source may include an elongate rod having a first end and a second end, and a detonator coupled to the first end and a bull plug coupled to the second end. The seismic source may further include an explosive helically-wrapped about the elongate rod continuously from the first end to the second end thereof.

In some aspects of the disclosure, a method of generating shear wave energy for seismic monitoring is disclosed. The method may include lowering a seismic source into a wellbore. The seismic source may include an elongate rod having a detonator coupled at a first end thereof and a bull plug coupled to a second end thereof. The method may also include detonating an explosive that is helically-wrapped about the elongate rod from the first end to the second end thereof. In one embodiment, the explosive may be helically-wrapped at a predetermined pitch angle about the elongate rod. The method may further include controlling a speed of detonation of the explosive in an axial direction of the elongate rod in order to maximize the shear wave energy.

In some aspects of the disclosure, another seismic source is disclosed. The seismic source may include an elongate rod having a first end and a second end, and a detonator coupled to the first end, and a bull plug coupled to the second end. The seismic source may further include a series of explosives arranged along an axial length of the rod. Each explosive may be axially-offset a predetermined distance from an axially-adjacent explosive of the series of explosives. Moreover, each explosive may be configured for cooperative time-delayed detonation with the axially-adjacent explosive along the axial length of the elongate rod.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present invention relates to seismic energy sources and, more particularly, to seismic energy sources configured to generate enhanced shear wave energy in order to more accurately determine the distribution and orientation of fractures in subterranean formations.

The exemplary seismic energy sources disclosed herein provide a directionally-focused, asymmetric explosive source oriented to provide a delayed discharge of energy toward the bottom (or top) of a wellbore. While perforation guns provide explosive energy in the radial direction, typically toward the casing in a wellbore, the present embodiments minimize the energy in the radial direction in favor of maximizing the energy along the axial direction of the borehole, which induces shear waves in the surrounding rock formation. A time delayed, asymmetric energy source will impart more shear wave energy into the surrounding rock. Moreover, after detonation of the exemplary seismic energy sources described herein, the seismic energy source is able to be retrieved and used in subsequent seismic well monitoring applications.

Figure 1:
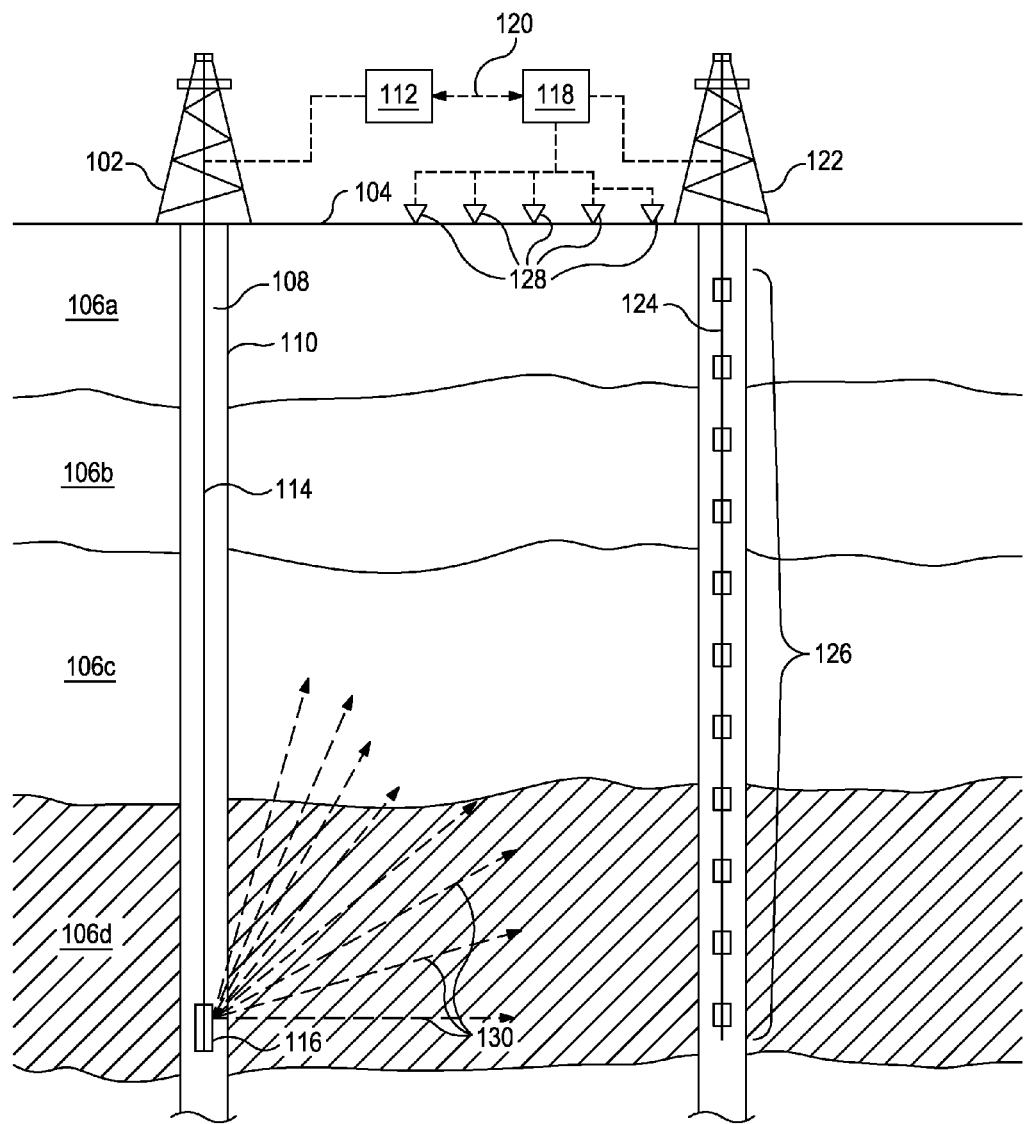
FIG. 1 illustrates an exemplary process of obtaining seismic geophysical surveys, according to one or more embodiments.

Referring to FIG. 1, illustrated is an exemplary process or arrangement for obtaining seismic geophysical surveys, according to one or more embodiments. As illustrated, a production well 102 extends downward from a surface 104 and through various subterranean formations 106a-d, including subterranean formation 106d, which may include one or more hydrocarbons of interest. In one or more embodiments, the production well 102 may have been prepared for hydraulic fracturing techniques by first drilling a bore 108 to a predetermined depth, and then cementing a casing 110 into the production well 102 to seal the bore 108 from the geological layers 106a-d.

While the production well 102 is depicted as being generally vertical, it will be appreciated that the present disclosure is equally applicable for use in wellbores having other directional configurations including horizontal wellbores, deviated wellbores, slanted wellbores, combinations thereof, and the like. Moreover, use of directional terms such as above, below, upper, lower, upward, downward, uphole, downhole, and the like are used in relation to the illustrative embodiments as they are depicted in the figures; the upward direction being toward the top of the corresponding figure and the downward direction being toward the bottom of the corresponding figure; the uphole direction being toward the surface 104 and the downhole direction being toward the toe or bottom of the well.

A transmitter system 112 may be arranged at the surface 104 and communicably coupled to the production well 102 in order to initiate microseismic fracture mapping using seismic source timing measurements for velocity calibration. Specifically, the transmitter system 112 may be communicably coupled to a wireline 114 that is extended into the production well 102. A seismic source 116 may be coupled to the wireline 114 at or near the bottom thereof. In at least one embodiment, the seismic source 116 may be triggered or otherwise detonated electrically through the wireline 114 in order to initiate a microseismic event to be monitored or otherwise analyzed.

A data analysis system 118 may be communicably coupled to the transmitter system 112 at the surface 104, either wired or wirelessly, via a transmitting medium 120. The data analysis system 118 may be communicably coupled to a monitor well 122 that is laterally spaced from the production well 102. Similar to the production well 102, the monitor well 122 may also extend downwardly through the various subterranean formations 106a-d. The monitor well 122 may be a discontinued production well, or may alternatively be a wellbore drilled specifically for the purposes described herein. The distance between the production well 102 and the monitor well 122 is often dependent on the location of existing wells, and the permeability of the local strata. For example, in certain locations, the surrounding subterranean formations 106a-d may require that the production well 102 and the monitor well 122 be located relatively close together. In other locations, however, the surrounding subterranean formations 106a-d may enable the production well 102 and monitor well 122 to be located relatively far apart.

While only one monitor well 122 is depicted in FIG. 1, it will be appreciated that more than one monitor well 122 having additional corresponding data analysis systems 118 communicably coupled to the transmitter system 112 may be employed, without departing from the scope of the disclosure. Moreover, as the production well 102 may include other directional configurations besides vertical (i.e., horizontal, slanted, etc.), the monitor well 122 may equally be arranged at any directional configuration and nonetheless remain within the scope of the disclosure.

The data analysis system 118 may be communicably coupled to a wireline 124 extended into the monitor well 122. One or more receiver units 126 may be coupled to the wireline 124; FIG. 1 depicts an array of receiver units 126. The array of receiver units 126 may be axially spaced from each other along the wireline 124 at predetermined distances. In some embodiments, the receiver units 126 may contain tri-axial seismic receivers (e.g., transducers) such as geophones or accelerometers, i.e., three orthogonal geophones or accelerometers. In addition, the receiver units 126 may contain four-component instruments, and also include three-component orthogonal geophones or accelerometers and hydrophones. In other embodiments, however, it may not be necessary that each receiver unit 126 be used for all three directions. For example, the type of receiver unit chosen may depend upon the characteristics of the microseismic event to be detected, such as the frequency of the microseismic event. In other embodiments, the type of receiver unit chosen may depend upon the physical parameters of the subterranean formations 106a-d.

The desired amount of independent information, as well as the degree of accuracy of the data to be obtained from the microseismic event will directly affect the minimum number of receiver units 126 used or otherwise required. In a number of applications, including hydraulic fracturing methods and long term reservoir monitoring applications (e.g., reservoir production and/or injection), important information may include the specific elevation of the seismic source 116, which produces the microseismic waves 130 (i.e., p-waves and s-waves), with respect to an individual receiver unit 126, and the lateral distance away from the given receiver unit 126.

Time of origination of the microseismic event is also a frequently used metric which is estimated from the arrival times of the event recorded at the respective receiver units 126. For example, the receiver units 126 on the wireline 124 may be spaced apart from each other a sufficient distance so as to allow a measurable difference in the time of arrival of the microseismic waves 130 emanating from the microseismic event originating at the production well 102. The determination of the origin time and spatial location of a microseismic event critically depends upon an accurate, calibrated velocity model for the subterranean formations 106a-d. The starting point for determining the velocity model is typically a sonic log or a vertical seismic profile-derived velocity field which is collected in the monitor well 122 or the source or production well 102, or another adjacent well located in the general area. The starting velocity is then updated or improved using additional information from either perforation shots, string shots, or one or more of the exemplary seismic sources described herein detonated in the production well 102.

One method to update the velocity model is to only measure the relative p-wave and s-wave timing delays across the array of receivers 126 and then to mathematically invert for the velocities in the rock layers in the subterranean formations 106a-d. A much more accurate updating methodology is to use the actual recorded time delay at the receivers 126 from the seismic source firing time recorded at the source 116. In order to measure the actual time delay from the shot firing time at the source 116 to the receivers 126, the absolute or exact time when the source 116 fires must be recorded. The time delays are then computed by subtracting the absolute times of the p-waves and s-waves at the individual receivers 126 from the absolute time of when the source 116 fired. Additional discussion regarding the determination of the time of origination of the microseismic event is available in co-owned U.S. Pat. No. 7,660,194, entitled "Microseismic Fracture Mapping using Seismic Source Timing Measurements for Velocity Calibration," the contents of which are hereby incorporated by reference to the extent not inconsistent with the present disclosure.

While FIG. 1 depicts the data analysis system 118 as being communicably coupled to the receiver units 126 arranged within the monitor well 122, it is also contemplated herein to monitor the microseismic waves 130 (i.e., p-waves and s-waves) at the surface 104. For example, one or more seismic receivers 128 may be arranged at the surface 104 for detecting the microseismic waves 130, without departing from the scope of the disclosure. The seismic receivers 128 may each be communicably coupled (wired or wirelessly) to the data analysis system 118 for communicating the detected microseismic waves 130 thereto for processing.

Figure 2:
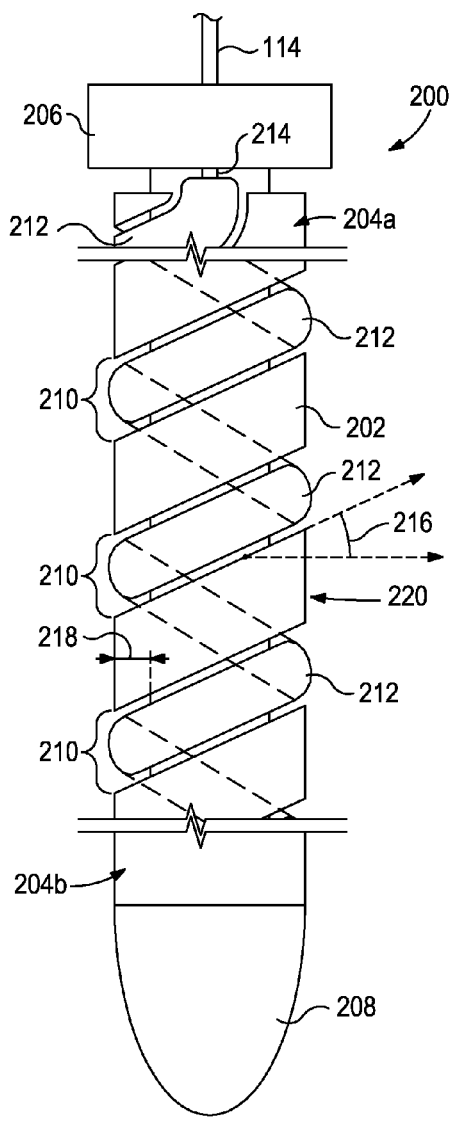
FIG. 2 illustrates an exemplary seismic source, according to one or more embodiments.

Referring now to FIG. 2, illustrated is an exemplary seismic source 200, according to one or more embodiments disclosed. The seismic source 200 may be similar to the seismic source 116 described above with reference to FIG. 1, and therefore may be used in the exemplary configuration shown therein. Specifically, the seismic source 200 may be configured to provide both p and s-wave energy used for calibrating the velocity model in locating microseismic events. As illustrated, the seismic source 200 includes an elongate rod 202 having a first end 204a and a second end 204b. The rod 202 may be made of any rigid material including, but not limited to, stainless steel, steel alloys, rebar, plastics, ceramics, hardened elastomers, combinations thereof, or the like. The overall length of the rod 202 from the first end 204a to the second end 204b may vary depending on the particular seismic survey application undertaken. For example, the length of the rod 202 may range from about 5 ft, about 10 ft, about 30 ft, about 50 ft, to about 100 ft long. In some embodiments, the length of the rod 202 may extend even longer than 100 ft without departing from the scope of the disclosure.

A firing sub or detonator 206 may be coupled or otherwise attached to the first end 204a of the rod 202. The wireline 114 that is extended from the surface 104 (FIG. 1) may be coupled to the detonator 206 and include any leads (not shown) or any other mechanical or electrical components required in order to transmit a trigger signal to the detonator 206 from the transmitter system 112 (FIG. 1). A bull plug 208 may be coupled or otherwise attached to the second end 204b of the rod 202. As the seismic source 200 is lowered into the wellbore, the bull plug 208 may help guide and direct the seismic source 200, and generally prevent any foreign contaminants from being lodged within the seismic source 200 and thereby compromise proper function thereof. Various shapes and configurations of the bull plug 208 are equally suitable for use in the disclosed embodiments, without departing from the scope of the disclosure.

The elongate rod 202 may have one or more grooves 210 defined therein and extending about the entire circumference of the rod 202. As shown in FIG. 2, the groove 210 may be a helically-formed groove configured to continuously extend along the axial length of the rod 202, from the first end 204a of the rod 202 to the second end 204b thereof. An explosive 212 may be arranged within the groove 210 and configured to continuously follow the helically-formed path of the groove 210 likewise from the first end 204a of the rod 202 to the second end 204b. In one embodiment, the explosive 212 may be a commercially-available detonating cord, such as PRIMACORD®. In other embodiments, however, the explosive 212 may be any high explosive composition such as, but not limited to, HMX, RDX, pentaerythritol tetranitrate (PETN), combinations thereof, or the like.

The explosive 212 may be communicably coupled to the detonator 206 via, for example, one or more leads 214 or another suitable connective device in order to trigger the detonation of the explosive 212. Cord-type explosives, such as the explosive 212 depicted in FIG. 2, are configured to progressively detonate or explode from one end of the cord to its other end. In the illustrated example, detonation of the explosive 212 is configured to commence at the first end 204a of the rod 202, and proceed helically down the axial length of the rod 202 until reaching the second end 204b. The groove 210 may be defined or otherwise formed in the elongate rod 202 as having a predetermined pitch angle 216. As a result, the speed of detonation of the explosive 212 wrapped within the groove 210 along the axial length of the rod 202 will be reduced by a factor of the sine of the pitch angle 216. For instance, a steeper (i.e., larger) pitch angle 216 will result in less of a time delay for the explosive 212 to detonate along its entire length, and a more shallow (i.e., smaller) pitch angle 216 will result in an increased time delay for complete detonation. In operation, the explosive 212 progressively detonates along its longitudinal length by following the helical path of the groove 210, and thereby reducing the axial speed of detonation. Consequently, wrapping the explosive 212 about the elongate rod 202 within the groove 210 serves to modify or otherwise control the speed of detonation in the axial direction along the length of the rod 202.

As will be appreciated by those skilled in the art, such a time-delayed detonation configuration provides an array of seismic sources that is capable of beaming s-wave to a desired angle and amplifying the s-wave signals by coherently stacking shear waves. While conventional symmetric seismic sources are able to maximize the generation of p-wave energy along the horizontal direction, asymmetric seismic sources, such as the seismic source 200 described above, provides a time-delayed energy source that allows a user to tune s-wave beaming angles and thereby impart more s-wave energy into the surrounding subterranean formation 106d (FIG. 1). The long, continuous explosive charge of the explosive 212 offers substantial advantages. For example, such elongated explosives 212 exhibit directional properties in that the created s-waves travel in a preferred direction with maximum strength, and at the same time cause less unwanted disturbances travelling in other directions.

Accurately recording the s-waves requires a determination of both the horizontal displacement "u" and the vertical displacement "w" of the s-waves through the subterranean formation 106b (FIG. 1) as detected by the array of receiver units 126 and/or 128 (FIG. 1). These displacement parameters can be determined using the following equations (1) and (2):

$$u = i4\rho_1(\sin^2\phi \cos^2\phi)\Gamma \quad (1)$$

$$w = i4\rho_1(\sin\phi \cos^3\phi)\Gamma \quad (2)$$

where $$\Gamma = \frac{\omega^2 e^{-\frac{i\omega R}{\beta_2}}}{R\beta_2^2 \rho_2 \left(\frac{\rho_1}{\rho_2} + \frac{\beta_2^2}{\alpha_1^2} - \cos^2\phi\right)}$$

and $\phi$ is the elevation angle of the shear wave, $\rho_1$ is the fluid density of the fluid within the wellbore, $\rho_2$ is the formation density, $\alpha_1$ is the fluid compressional velocity, $\beta_2$ is the shear wave velocity, w is the angular frequency of the s-wave, and R is the source-receiver separation.

Through the use of equations (1) and (2), it is evident that s-wave reaches a maximum displacement when propagating along certain angles, i.e., $\phi_{max}$, which can be numerically calculated using the properties of the fluid inside the wellbore and the surrounding subterranean formation 106d (FIG. 1). In order to excite the maximum amount of s-wave energy, a delay time "$\Delta t$" to detonate individual explosions separated by a distance "d" along the length of the elongate rod 202 can be determined using equation (3):

$$\Delta t = \frac{d \sin\phi_{max}}{\beta_2} \qquad (3)$$

For cord-type explosives, such as the explosive 212 shown in FIG. 2, a preferred pitch 216 "θ" of the groove 210 may be given by equation (4):

$$\theta = \sin^{-1}\left(\frac{d}{\Delta t V_e}\right) = \sin^{-1}\left(\frac{(\beta_2)}{V_e \sin\phi_{max}}\right) \qquad (4)$$

where $V_e$ is the detonation velocity of the explosive 212. If, for example, the direction of the maximum shear energy is determined to be $\phi_{max}=45°$, the detonation velocity $V_e$ is 18,000 ft/sec (PRIMACORD®, for example, has a longitudinal detonation velocity of about 18,000 ft/sec), and the shear wave velocity $\beta_2$ of the subterranean formation 106b (FIG. 1) is 8000 ft/sec, then the preferred pitch angle 216 of the groove 210 could be determined as shown in equation (5):

$$\theta = \sin^{-1}\left(\frac{(\beta_2)}{V_e \sin\phi_{max}}\right) = \sin^{-1}\left(\frac{8000}{18000\sin(45°)}\right) = 38.9° \qquad (5)$$

Accordingly, depending on the various parameters discussed above, a preferred pitch angle 216 of the groove 210 may be determined, and the elongate rod 202 may be manufactured to match that angle 216, thereby yielding the maximum s-wave propagation to be detected.

The groove 210 may be defined to a predetermined radial depth 218 configured to receive the explosive 212. In one embodiment, the depth 218 of the groove 210 may be sufficient to receive all of the explosive 212, such that the explosive 212 does not protrude radially from the groove 210 and past the outer circumferential surface of the elongate rod 202. In other embodiments, however, the depth 218 may be configured such that a portion of the explosive protrudes radially from the groove 210 and past the outer circumferential surface of the elongate rod 202. The remaining portions of the elongate rod 202 that do not form part of the groove 210 may be characterized as a baffle 220 configured to provide a separation barrier between axially adjacent portions of the explosive 212.

In FIG. 2, for example, the baffle 220 forms a corresponding helically-formed structure separating axially-adjacent portions of the groove 210 along the axial length of the rod 202. In operation, the baffle 220 prevents the explosive 212 from prematurely detonating along a direct axial route along the axial length of the elongate rod 202. As such, the baffle 220 may serve to isolate the detonation of the explosive 212 within the groove 210, such that the explosive 212 is required to detonate along its helically-winding route.

Figure 3:
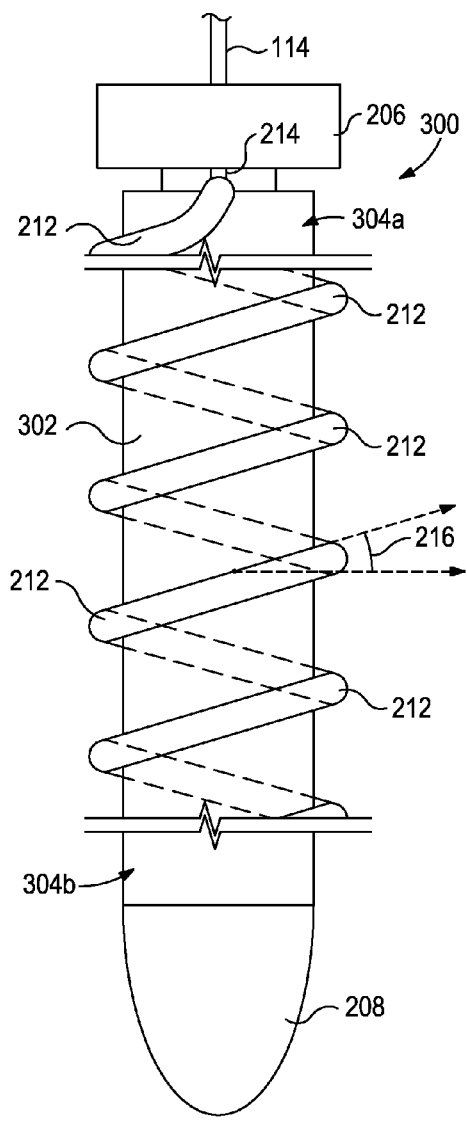
FIG. 3 illustrates another exemplary seismic source, according to one or more embodiments.

Referring now to FIG. 3, illustrated is another exemplary seismic source 300, according to one or more embodiments disclosed. The seismic source 300 may be substantially similar to the seismic source 200 described above with reference to FIG. 2. Accordingly, the seismic source 300 may be best understood with reference to FIG. 2, where like numerals indicate like elements that will not be described again in detail. The seismic source 300 includes an elongate rod 302 having a first end 304a and a second end 304b. The elongate rod 302 may be similar to the elongate rod 202 in FIG. 2, with the exception that the elongate rod 302 in FIG. 3 does not define helical grooves along its axial length. Instead, the explosive 212 may be wrapped about the outer circumferential surface of the rod 302.

In some embodiments, the explosive 212 may be helically-wrapped about the outer circumferential surface of the rod 302, as depicted, and continuously extend from about the first end 304a to about the second end 304b. In at least one embodiment, the explosive 212 may be wrapped about the rod 302 according to the predetermined pitch angle 216, as generally described above. In order to maintain the desired pitch angle 216, the explosive 212 may be affixed to the rod 302 using, for example, electrical adhesive tape. In other embodiments, however, the explosive 212 may be affixed to the rod 302 using other types of adhesive tapes, mechanical coupling devices, combinations thereof, or the like.

Similar to the embodiment shown in FIG. 2 above, detonation of the explosive 212 will again commence at the first end 304a of the rod 302, and proceed helically down the axial length of the rod 302 until reaching the second end 304b. The axial speed of denotation of the explosive 212 in FIG. 3 will be reduced by a factor of the sine of the pitch angle 216. Consequently, wrapping the explosive 212 about the elongate rod 202 using more or less windings (i.e., lower or higher pitch angles 216, respectively) will effectively modify the speed of detonation in the axial direction along the length of the rod 302. Those skilled in the art will readily recognize the various modifications to the pitch angle 216 that may be undertaken in order to correspondingly modify the speed of detonation.

Figure 4:
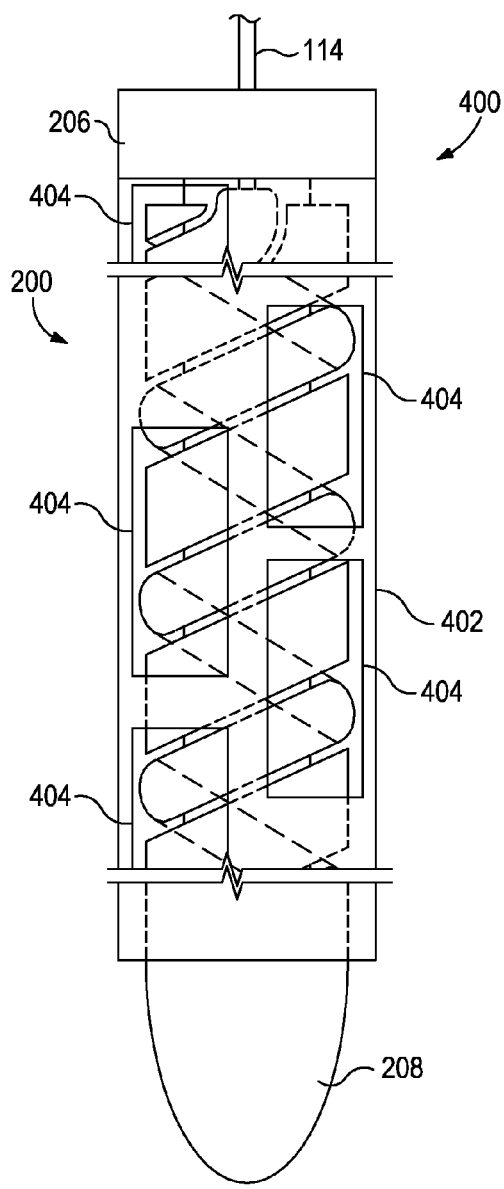
FIG. 4 illustrates another exemplary seismic source, according to one or more embodiments.

Referring now to FIG. 4, illustrated is another exemplary seismic source 400, according to one or more embodiments disclosed. The seismic source 400 may include a protective casing 402 configured to house substantially all or at least a portion of the components of any one of the seismic sources described herein. For example, as shown in FIG. 4, the protective casing 402 may be configured to house the seismic source 200, as described above with reference to FIG. 2. In one embodiment, the protective casing 402 may be coupled or otherwise attached to the detonator 206. In other embodiments, however, the protective casing 402 may be coupled to the corresponding seismic source that it is intended to protect at any feasible location, such as being coupled to the elongate rod. In yet other embodiments, the protective casing 402 may also or otherwise alternatively be coupled to the bull plug 208 in order to help prevent the influx of foreign contaminants as the seismic source 400 is being introduced into the wellbore.

In some embodiments, the protective casing 402 may be an elongate cylinder having an inside diameter large enough to receive the components of any one of the seismic sources described herein. In other embodiments, the protective casing 402 may be formed of other geometrical shapes, without departing from the scope of the disclosure.

The protective casing 402 may also define one or more windows 404 along its axial length. In some embodiments, the windows 404 may be equidistantly spaced from each other along the axial length of the casing 402. In other embodiments, however, the windows 404 may be randomly spaced from each other along the axial length of the casing 402. Likewise, in some embodiments, one or more of the windows 404 may be equidistantly spaced about the circumference of the casing 402, yet in other embodiments, the windows 404 may be randomly spaced from each other about the circumference of the casing 402, without departing from the scope of the disclosure.

In operation, the protective casing 402 may be configured to protect the seismic device stowed or otherwise arranged therein and its components as it is being introduced into the wellbore. For example, the protective casing 402 may be configured to protect the explosive 212 from becoming dislodged or otherwise damaged by contacting foreign objects found within the wellbore during its descent. Moreover, the windows 404 may be configured to allow explosion energy to escape the protective casing 402, thereby allowing the desired p and s-waves to be properly emitted. Thus the particular sizing of the windows 404 may be large enough to allow the escape of the seismic energy but not so large that it would degrade the strength of the casing 402 to withstand the detonation.

Figure 5:
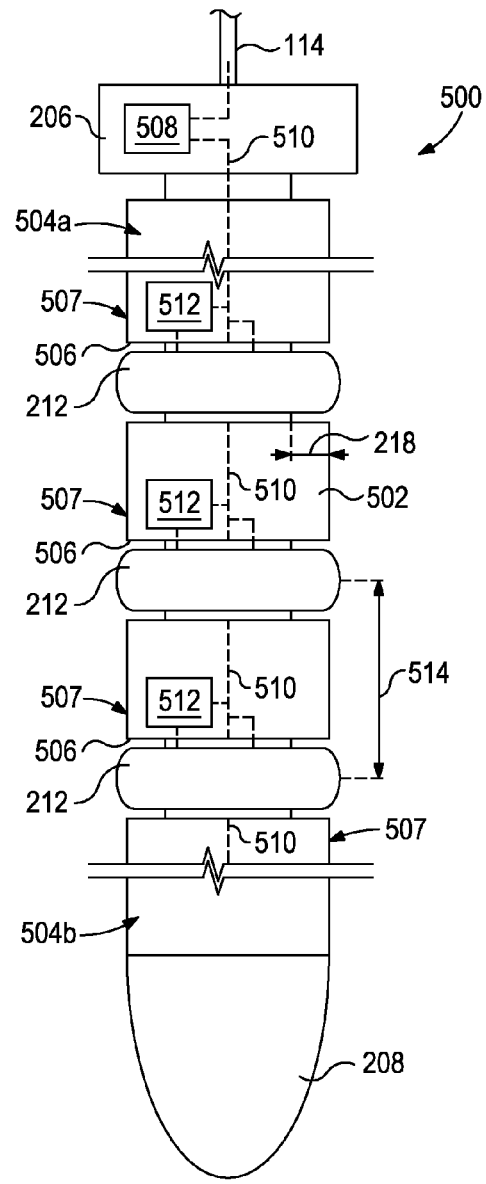
FIG. 5 illustrates another exemplary seismic source, according to one or more embodiments.

Referring now to FIG. 5, illustrated is another exemplary seismic source 500, according to one or more embodiments disclosed. The seismic source 500 may be substantially similar to the seismic sources 200 and 300 described above with reference to FIGS. 2 and 3, respectively, and therefore will be best understood with reference thereto, where like numerals indicate like elements that will not be described again in detail. The seismic source 500 may include an elongate rod 502 having a first end 504a and a second end 504b. The elongate rod 502 may be substantially similar to the elongate rod 200 described above with reference to FIG. 2. Instead of defining helical grooves 210 (FIG. 2), however, the elongate rod 502 may define one or more annular grooves 506 (three grooves 506 shown in FIG. 5), wherein each groove 506 extends about the entire circumference of the rod 502.

Each groove 506 may have an explosive 212 arranged therein for individual, time-delayed detonation configured to provide an asymmetric seismic source capable of generating amplified s-waves. In some embodiments, the explosive 212 may be a length of PRIMACORD® or another cord-like explosive wrapped into an annular configuration and arranged within a corresponding groove 506. Similar to the groove 210 described above with reference to FIG. 2, each groove 506 may be defined to a predetermined radial depth 218 configured to receive the explosive 212. In some embodiments, the depth 218 of each groove 506 may be the same. In other embodiments, however, the depth 218 of axially-adjacent grooves 506 may be different. The depth 218 may be sufficient to receive all of the explosive 212, such that the explosive 212 does not protrude radially from the groove 506 and past the outer circumferential surface of the elongate rod 502. In other embodiments, however, the depth 218 may be configured such that a portion of the explosive protrudes radially from the groove 506.

Embodiments are also contemplated herein where the depth 218 of one or more of the grooves 506 is effectively zero, or there is no calculable depth 218. In other words, in some embodiments one or more of the grooves 506 may be entirely omitted from the rod and the explosive 212 may be coupled or otherwise attached directly to the outer radial surface of the rod 502, without departing from the scope of the disclosure. In such embodiments, the explosive 212 may be coupled to the rod with adhesive tape or any other suitable means known to those skilled in the art.

The remaining portions of the elongate rod 502 that do not form part of the grooves 506 may be characterized as annular baffles 507 configured to provide a separation barrier between axially-adjacent explosives 212. In operation, the baffles 507 prevent the explosive 212 from prematurely detonating an axially-adjacent explosive 212 along a direct axial route along the axial length of the elongate rod 502. As such, the baffles 507 serve to isolate the detonation of each explosive 212 within its corresponding groove 506.

The seismic device 500 may also include a delayed timing device 508 communicably coupled to the detonator 206 and/or the wireline 114 and configured to control the detonation of each individual explosive 212 along the length of the rod 502. In some embodiments, the delayed timing device 508 may be communicably coupled to each explosive 212 via one or more leads 510 or any other suitable electrical communication means. In other embodiments, however, the delayed timing device 508 may be communicably coupled to one or more sub-detonators 512, where each sub-detonator 512 is configured to trigger the detonation of a corresponding individual explosive 212. For example, the seismic device 500 may include a sub-detonator 512 for each explosive 212, and the delayed timing device 508 may be configured to communicate individualized detonation times for each respective explosive 212 via its corresponding sub-detonator 512.

In operation, the delayed timing device 508 may be configured to individually trigger each explosive 212 (or each corresponding sub-detonator 512, where applicable) in order to generate an asymmetric energy source configured to impart increased s-wave energy into the surrounding subterranean formation 106b (FIG. 1). To accomplish this, the delayed timing device 508 may be configured to reduce the speed of detonation downward through each respective explosive 212, thereby resulting in a directional release of energy in the direction of the longitudinal axis of the wellbore.

The axial distance 514 between axially-adjacent grooves 506 is an important factor in the timing of each individualized detonation. The distance 514 may be similar to the distance "d" discussed above with reference to equation (3), which generally calculates a suitable delay time "Δt" for detonating individual explosions separated by the distance 514 (i.e., "d") along the length of the elongate rod 502. Accordingly, equation (3) may be utilized to determine the appropriate time delay between axially-adjacent explosions, taking into account the distance 514 between each groove 506, in order to excite the maximum s-wave.

Figure 6:
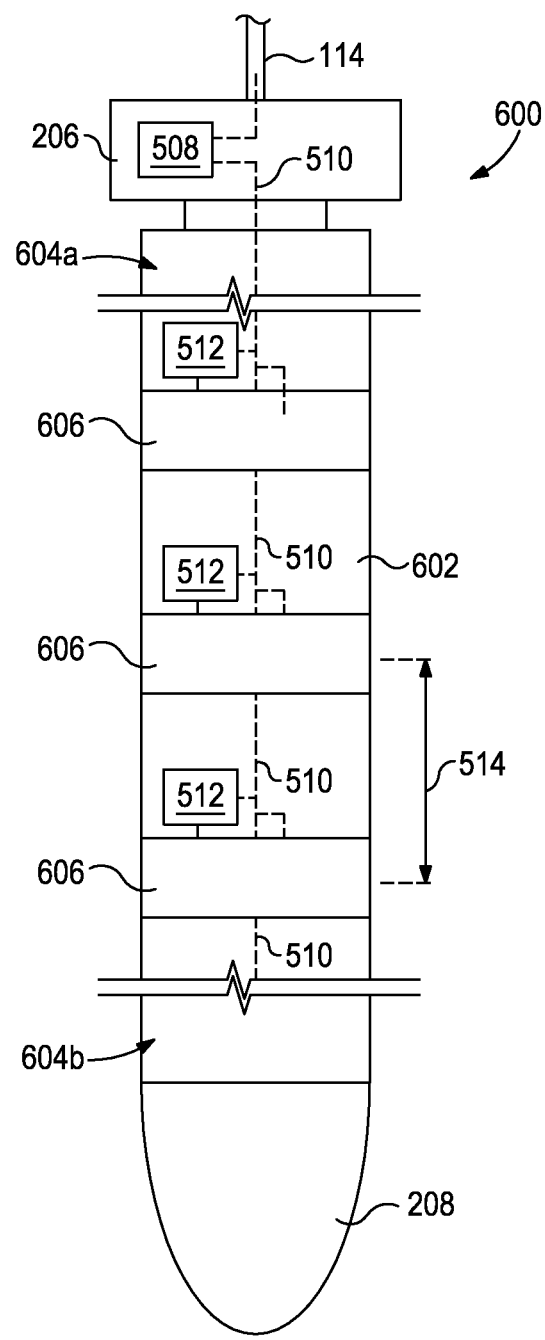
FIG. 6 illustrates another exemplary seismic source, according to one or more embodiments.

Referring now to FIG. 6, illustrated is another exemplary seismic source 600, according to one or more embodiments disclosed. The seismic source 600 may be substantially similar to the seismic source 500 described above with reference to FIG. 5, and therefore will be best understood with reference thereto, where like numerals indicate like elements that will not be described again in detail. The seismic source 600 may include an elongate rod 602 having a first end 604a and a second end 604b. The elongate rod 602 may be a cylindrical tool having one or more chambers 606 configured to house explosives (not shown). In one embodiment, the explosives housed within one or more of the chambers 606 may be substantially similar to the explosives 212 discussed above. In other embodiments, any type of explosive may be used, without departing from the scope of the disclosure.

The delayed timing device 508 may be communicably coupled to each chamber 606 via one or more leads 510 and configured to control the detonation of the explosives disposed within each individual chamber 606. In other embodiments, however, the delayed timing device 508 may be communicably coupled to one or more sub-detonators 512 configured to trigger the detonation of a corresponding explosive arranged within each chamber 606, as generally described above with reference to FIG. 5. In operation, the delayed timing device 508 may individually trigger the explosive in each compartment 606 (or each corresponding sub-detonator 512, where applicable) in order to generate an asymmetric energy source configured to impart increased s-wave energy into the surrounding subterranean formation 106d (FIG. 1). As with the seismic device 500 in FIG. 5, the axial distance 514 between axially-adjacent compartments 606 is an important factor in the timing of each individualized detonation, and equation (3) provided above may again be utilized in determining the appropriate time delay between adjacent explosions, taking into account the distance 514 between each compartment 606, in order to excite the maximum s-wave.

After detonating the explosive(s) in any of the embodiments discussed herein, the respective seismic source 200, 300, 400, 500, 600 may be retrieved for use in a subsequent seismic monitoring application. It should also be noted that although the seismic sources 200, 300, 400, 500, 600 have each been described as providing a detonation of the explosive(s) 212 that proceeds from the first end of the corresponding elongate rod to the second end, embodiments are also contemplated herein where the detonation of the explosive(s) 212 proceeds from the second end of the corresponding rod to the first end, without departing from the scope of the disclosure.

The present disclosure further provides a method of generating shear wave energy for microseismic monitoring. The exemplary method may include lowering a seismic source into a wellbore. The seismic source may include an elongate rod having a detonator coupled at a first end thereof and a bull plug coupled to a second end thereof. The method may also include detonating an explosive that is helically-wrapped about the elongate rod from the first end to the second end thereof. In at least one embodiment, the explosive may being helically-wrapped at a predetermined pitch angle about the elongate rod. In one or more embodiments, detonating the explosive may further include detonating the explosive within a helically-formed groove that is defined in the elongate rod and continuously extends from the first end to the second end of the elongate rod. In at least one embodiment, detonation of the explosive may be isolated from axially-adjacent portions of the explosive with a helically-formed baffle defined on the elongate rod. The method may further include controlling a speed of detonation of the explosive in an axial direction of the elongate rod in order to maximize the shear wave energy. In one or more embodiments, controlling the speed of detonation of the explosive may include modifying a pitch angle of the explosive.

While the disclosure discusses various devices and methods directed primarily to microseismic monitoring and generating s-wave energy for microseismic monitoring applications, those skilled in the art will readily recognize that similar devices and methods may equally be applied to seismic monitoring, without departing from the scope of the disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A seismic source, comprising:
an elongate rod having a first end, a second end, and a helically-formed groove defined in the elongate rod and continuously extending between the first and second ends;
a detonator coupled to the first end and a bull plug coupled to the second end; and
an explosive helically-wrapped about the elongate rod continuously from the first end to the second end thereof and arranged within the helically-formed groove, wherein the helically-formed groove has a predetermined pitch angle that controls a speed of detonation of the explosive in an axial direction of the elongate rod.

2. The seismic source of claim 1, wherein the explosive is a detonating cord.

3. The seismic source of claim 1, wherein, as a result of the helically-formed groove, the elongate rod further defines a helically-formed baffle configured to separate axially-adjacent portions of the explosive.

4. A method of generating shear wave energy for seismic monitoring, comprising:
lowering a seismic source into a wellbore, the seismic source comprising an elongate rod having a detonator coupled at a first end thereof and a bull plug coupled to a second end thereof;

detonating an explosive that is helically-wrapped about the elongate rod from the first end to the second end thereof, the explosive being helically-wrapped at a predetermined pitch angle about the elongate rod; and controlling a speed of detonation of the explosive in an axial direction of the elongate rod in order to maximize the shear wave energy.

5. The method of claim 4, wherein controlling the speed of detonation of the explosive further comprises modifying a pitch angle of the explosive.

6. The method of claim 4, wherein detonating the explosive further comprises detonating the explosive within a helically-formed groove defined in the elongate rod and continuously extending from the first end to the second end.

7. The method of claim 6, further comprising isolating a detonation of the explosive from axially-adjacent portions of the explosive with a helically-formed baffle defined on the elongate rod.

8. A seismic source, comprising:
an elongate rod having a first end, a second end, and a plurality of annular grooves defined in the elongate rod along an axial length thereof, each annular groove being axially-offset from each other by a predetermined distance;
a detonator coupled to the first end, and a bull plug coupled to the second end;
a series of explosives arranged within a corresponding one of the one or more of the plurality of annular grooves, each explosive being axially-offset by the predetermined distance from an axially-adjacent explosive of the series of explosives, and each explosive being configured for cooperative time-delayed detonation with the axially-adjacent explosive along the axial length of the elongate rod,
wherein, as a result of the plurality of annular grooves, the elongate rod further defines a corresponding plurality of baffles configured to separate axially-adjacent explosives.

9. The seismic source of claim 8, wherein the series of explosives are disposed within a corresponding series of compartments, each compartment being axially offset from each other by the predetermined distance.

10. The seismic source of claim 8, further comprising a delayed timing device communicably coupled to the detonator and configured to control the detonation of each explosive along the axial length of the elongate rod.

11. The seismic source of claim 10, further comprising one or more sub-detonators communicably coupled to the delayed timing device, each sub-detonator being configured to trigger a detonation of a corresponding explosive arranged within the plurality of annular grooves.

12. The seismic source of claim 8, further comprising a protective casing that houses at least a portion of the elongate rod and at least a portion of the series of explosives.

13. The seismic source of claim 12, wherein the protective casing defines one or more windows configured to protect the explosive as the seismic source is lowered into a wellbore and allow explosion energy to escape the protective casing upon detonation of the explosive.

14. A seismic source, comprising:
an elongate rod having a first end and a second end;
a detonator coupled to the first end and a bull plug coupled to the second end;
an explosive helically-wrapped about the elongate rod continuously from the first end to the second end thereof; and
a protective casing that houses at least a portion of the elongate rod and at least a portion of the explosive, wherein the protective casing defines one or more windows that protect the explosive as the seismic source is lowered into a wellbore and allow explosion energy to escape the protective casing upon detonation of the explosive.

15. The seismic source of claim 14, wherein the explosive is a detonating cord.

16. The seismic source of claim 14, further comprising a helically-formed groove defined in the elongate rod and continuously extending between the first and second ends of the elongate rod, wherein the explosive is arranged within the helically-formed groove.

17. The seismic source of claim 16, wherein the helically-formed groove has a predetermined pitch angle that controls a speed of detonation of the explosive in an axial direction of the elongate rod.

18. The seismic source of claim 14, wherein, as a result of the helically-formed groove, the elongate rod further defines a helically-formed baffle configured to separate axially-adjacent portions of the explosive.

* * * * *